(12) United States Patent
Domig

(10) Patent No.: US 11,148,704 B2
(45) Date of Patent: Oct. 19, 2021

(54) STEERING COLUMN HAVING AN ENERGY ABSORPTION DEVICE

(71) Applicants: THYSSENKRUPP PRESTA AG, Eschen (LI); thyssenkrupp AG, Essen (DE)

(72) Inventor: Markus Domig, Bartholomäberg (AT)

(73) Assignees: THYSSENKRUPP PRESTA AG, Eschen (LI); THYSSENKRUPP AG, Essen (DE)

(*) Notice: Subject to any disclaimer, the term of this patent is extended or adjusted under 35 U.S.C. 154(b) by 168 days.

(21) Appl. No.: 16/497,122

(22) PCT Filed: Mar. 28, 2018

(86) PCT No.: PCT/EP2018/057954
§ 371 (c)(1),
(2) Date: Sep. 24, 2019

(87) PCT Pub. No.: WO2018/178168
PCT Pub. Date: Oct. 4, 2018

(65) Prior Publication Data
US 2021/0122406 A1     Apr. 29, 2021

(30) Foreign Application Priority Data
Mar. 31, 2017   (DE) .................... 10 2017 107 034.6

(51) Int. Cl.
*B62D 1/19* (2006.01)
*B62D 1/184* (2006.01)
(Continued)

(52) U.S. Cl.
CPC ............. *B62D 1/192* (2013.01); *B62D 1/184* (2013.01); *B62D 1/185* (2013.01); *F16F 7/125* (2013.01); *B62D 1/181* (2013.01)

(58) Field of Classification Search
CPC ........ B62D 1/192; B62D 1/185; B62D 1/184; B62D 1/181; F16F 7/125
See application file for complete search history.

(56) References Cited

U.S. PATENT DOCUMENTS

| 8,696,026 B2 | 4/2014 | Kircher |
| 10,759,465 B2* | 9/2020 | Ganahl .................. B62D 1/184 |

(Continued)

FOREIGN PATENT DOCUMENTS

| CN | 102099238 A | 6/2011 |
| CN | 102666250 A | 9/2012 |

(Continued)

OTHER PUBLICATIONS

English Translation of International Search Report issued in PCT/EP2018/057954, dated Jul. 12, 2018.

*Primary Examiner* — Drew J Brown
(74) *Attorney, Agent, or Firm* — thyssenkrupp North America, LLC

(57) ABSTRACT

A steering column for a motor vehicle, having an inner casing tube which rotatably supports a steering shaft, and an outer casing unit in which the inner casing tube is received movably in the axial direction and is fixable, also having an energy absorption device which is arranged functionally between the casing tube and the casing unit, in which a portion of the energy occurring in the event of a crash can be absorbed when the casing tube is moved telescopically relative to the casing unit, wherein the energy absorption device comprises at least one deformation strip, which is pulled through a brake element and thereby deformed, is improved according to the invention in order to reduce the installation space of the overall steering column in that the deformation strip is fastened on a carrier plate, which in turn (Continued)

is fastened to the casing tube and projects in the axial direction beyond the casing tube.

20 Claims, 5 Drawing Sheets

(51) Int. Cl.
*B62D 1/185* (2006.01)
*F16F 7/12* (2006.01)
*B62D 1/181* (2006.01)

(56) References Cited

U.S. PATENT DOCUMENTS

| | | | |
|---|---|---|---|
| 10,807,630 B2 * | 10/2020 | Caverly | B62D 1/192 |
| 2007/0194563 A1 * | 8/2007 | Menjak | B62D 1/195 |
| | | | 280/777 |
| 2007/0228716 A1 * | 10/2007 | Menjak | B62D 1/195 |
| | | | 280/777 |
| 2011/0210536 A1 | 9/2011 | Monteil | |
| 2012/0266716 A1 | 10/2012 | Sulser | |
| 2013/0068062 A1 | 3/2013 | Kircher | |
| 2015/0239490 A1 | 8/2015 | Sakata | |
| 2016/0046318 A1 * | 2/2016 | Stinebring | B62D 1/195 |
| | | | 74/493 |
| 2016/0121920 A1 * | 5/2016 | Klepp | B62D 1/195 |
| | | | 74/492 |
| 2016/0368524 A1 | 12/2016 | Tinnin | |
| 2017/0050665 A1 * | 2/2017 | Appleyard | B62D 1/195 |
| 2018/0050719 A1 * | 2/2018 | Agbor | B62D 1/184 |
| 2019/0161108 A1 * | 5/2019 | Kwon | B62D 1/192 |
| 2019/0232997 A1 * | 8/2019 | Domig | B62D 1/185 |
| 2020/0039570 A1 * | 2/2020 | Domig | B62D 1/192 |
| 2020/0189648 A1 * | 6/2020 | Domig | B62D 1/195 |
| 2021/0001916 A1 * | 1/2021 | Appleyard | B62D 1/187 |

FOREIGN PATENT DOCUMENTS

| | | |
|---|---|---|
| CN | 105209317 A | 12/2015 |
| DE | 10 2011 015 140 | 9/2012 |
| WO | 2014/048535 A | 4/2014 |
| WO | 2018073305 A | 4/2018 |

* cited by examiner

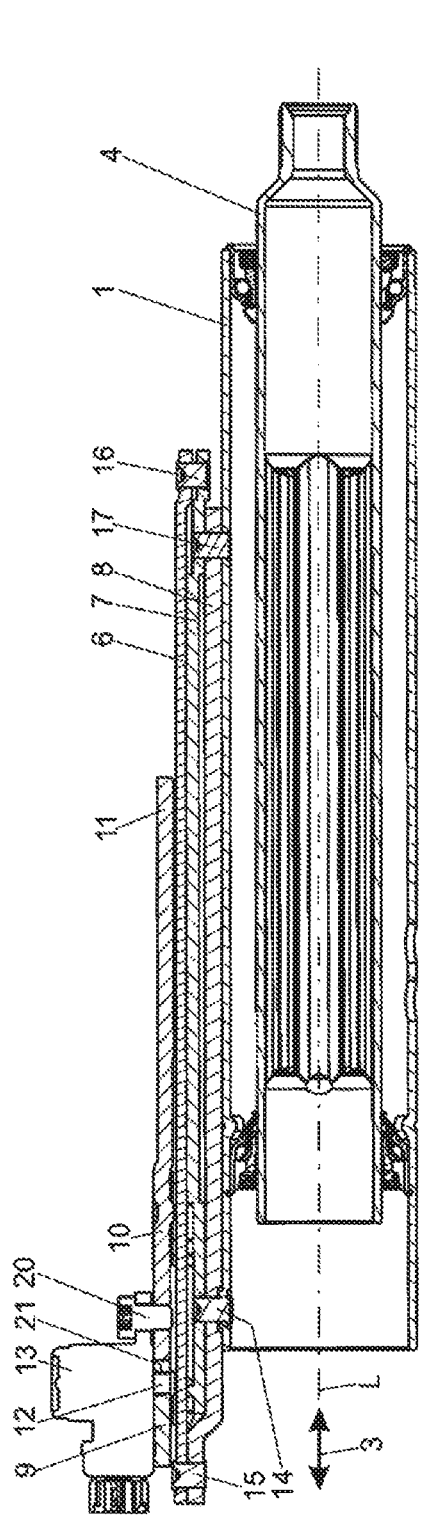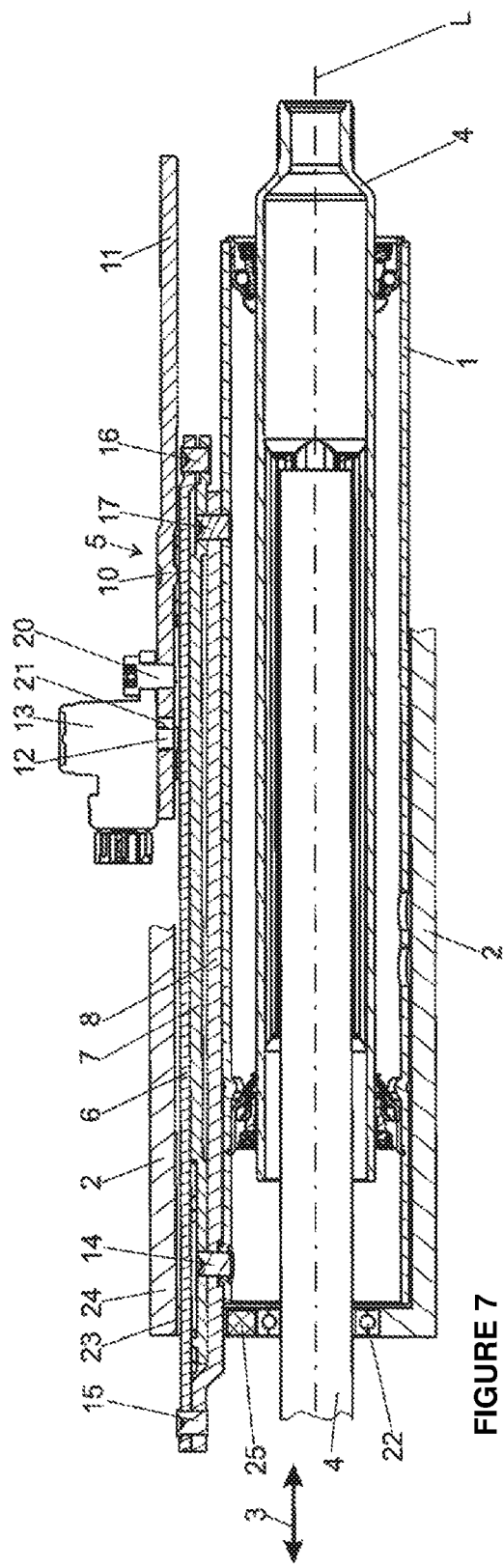
FIGURE 6
FIGURE 7

STEERING COLUMN HAVING AN ENERGY ABSORPTION DEVICE

CROSS REFERENCE TO RELATED APPLICATIONS

This application is a U.S. National Stage Entry of International Patent Application Serial Number PCT/EP2018/057954, filed Mar. 28, 2018, which claims priority to German Patent Application No. DE 10 2017 107 034.6, filed Mar. 31, 2017, the entire contents of both of which are incorporated herein by reference.

FIELD

The present disclosure generally relates to a steering column for a motor vehicle.

BACKGROUND

Such a steering column having an energy absorption device is known from DE 10 2011 015 140 A1, where a deformation strip is arranged on the inner casing tube. In order to provide a sufficient path for the telescopic displacement, the deformation strip must be long enough. There follows from this a casing tube dimensioned accordingly long enough to secure the deformation strip to it. The drawback of this solution is that it requires a large installation space for the steering column, or such a space must be kept clear, since in the event of a crash there cannot be any collisions of the individual components.

Thus a need exists for a steering column having an energy absorption device which at the same time comprises a compact design and is telescopic along a great distance in the event of a crash.

BRIEF DESCRIPTION OF THE FIGURES

FIG. 6 is a longitudinal sectional view through the inner casing tube with energy absorption device in the normal operating state.

FIG. 7 is a longitudinal sectional view through a casing tube with partial representation of the outer casing unit in the retracted state after a vehicle crash.

DETAILED DESCRIPTION

Figure 1:
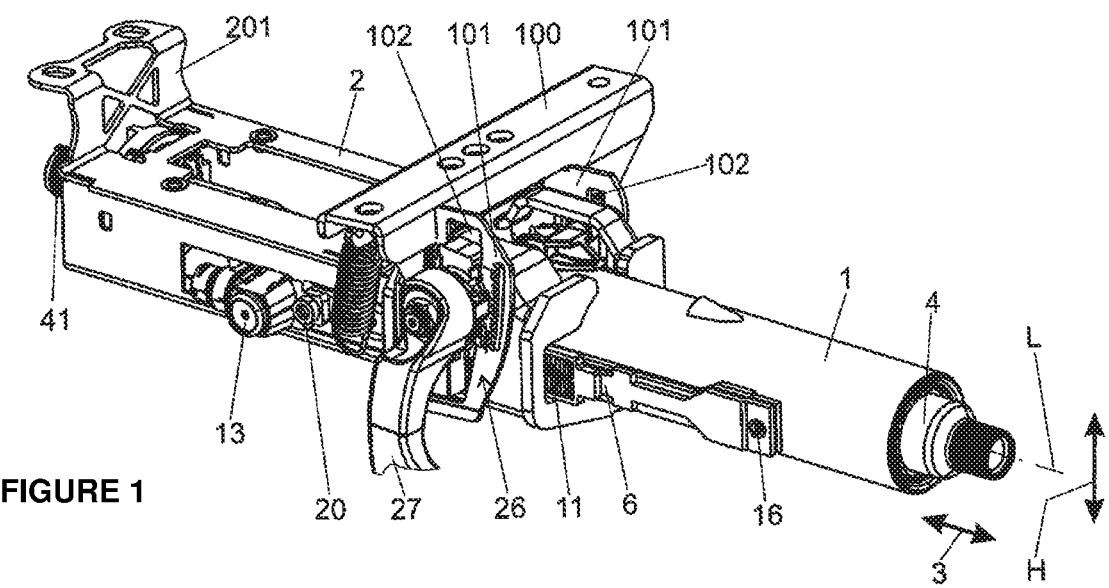
FIG. 1 is a perspective view of a steering column.

Although certain example methods and apparatus have been described herein, the scope of coverage of this patent is not limited thereto. On the contrary, this patent covers all methods, apparatus, and articles of manufacture fairly falling within the scope of the appended claims either literally or under the doctrine of equivalents. Moreover, those having ordinary skill in the art will understand that reciting "a" element or "an" element in the appended claims does not restrict those claims to articles, apparatuses, systems, methods, or the like having only one of that element, even where other elements in the same claim or different claims are preceded by "at least one" or similar language. Similarly, it should be understood that the steps of any method claims need not necessarily be performed in the order in which they are recited, unless so required by the context of the claims. In addition, all references to one skilled in the art shall be understood to refer to one having ordinary skill in the art.

The invention relates to a steering column for a motor vehicle, having an inner casing tube which rotatably supports a steering shaft, and an outer casing unit in which the inner casing tube is received movably in the axial direction and is fixable, also having an energy absorption device which is arranged functionally between the casing tube and the casing unit, in which a portion of the energy occurring in the event of a crash can be absorbed when the casing tube is moved telescopically relative to the casing unit, wherein the energy absorption device comprises at least one deformation strip, which is pulled through a brake element and thereby deformed. In some examples, the deformation strip is fastened on a carrier plate, which in turn is fastened to the casing tube.

Preferably, the carrier plate projects in the axial direction beyond the casing tube. Thanks to this measure, the deformation strip can be lengthened beyond the end of the casing tube, without the casing tube itself having to be longer. With a shorter inner casing tube, the outer casing unit and hence the entire steering column can be shorter and more compact in the axial direction. Even so, a longer deformation distance is available on the deformation strip.

The invention can be used with advantage especially when the design of the outer casing unit prevents the casing tube from being shoved into the casing unit by an arbitrary distance. In this case, an embodiment is recommended in which the portion of the carrier plate projecting beyond the casing tube with the deformation strip passes axially through an opening of the outer casing unit in the event of a crash. Preferably the carrier plate projects in the axial direction after the crash has occurred beyond the outer casing unit. For this embodiment, one needs only a small opening in the casing unit, since the projecting portion of the carrier plate with the deformation strip comprises a much smaller cross sectional area than the overall casing tube.

In an especially advantageous embodiment it is proposed that said opening is arranged radially outside a bearing for the steering shaft. Such a bearing prevents the further axial displacement of the casing tube in the casing unit. The bearing can be designed either as a plain bearing or as a ball bearing. But the bearing need not be in contact with the casing unit along its entire circumference. It may be provided that the bearing is installed in an adapter, and the adapter in turn is installed in the casing unit. Therefore, in the area of the projecting portion of the carrier plate with the deformation strip it is possible to provide an opening between the outer edge of the plain bearing or the ball bearing and the housing of the casing unit.

In an advantageously simple manner, the carrier plate is fastened by means of rivet connections to the casing tube.

The carrier plate affords the advantage that the deformation strip is held at a predetermined distance from the casing tube, so that a buckling of the deformation strip in the event of a crash is prevented by the carrier plate and thus the deformation strip can be prevented from moving out from the brake element. Thanks to the carrier plate, no design measures are needed, such as a raised web in the deformation strip facing toward the casing tube.

The invention may be used with advantage also in steering columns where two deformation strips are fastened to the carrier plate, which interact with two brake elements. Two deformation strips can take up more energy in the event of a crash than a single deformation strip.

In an advantageous modification it is provided that the deformation strips are arranged one on top of the other, the first deformation strip lying on top is narrower than the second deformation strip lying underneath, the first deformation strip is embraced and clamped by a narrower first brake element and the second deformation strip by a broader second brake element. By the first deformation strip lying on top is meant the deformation strip which is radially the furthest away from the casing tube, while the second deformation strip lying underneath is arranged between the first deformation strip and the casing tube. This design for two deformation strip is especially compact, because it requires hardly more installation space than an embodiment with a single deformation strip.

A further advantageous embodiment calls for the brake elements to be joined or coupled by a toothed plate to the outer casing unit, a locking element provided with teeth is joined to the outer casing unit by a clamping device, which presses the locking element against the toothed plate in order to fix it immovably on the casing unit during driving operation, so that a displacement of the casing tube with respect to the casing unit in the event of a crash is only possible by activating the energy absorption device. The toothed plate comprises a row of individual teeth, which can be brought into engagement with teeth of the locking element. This embodiment enables a lengthwise movement of the steering column in the axial direction. When the clamping device is opened, the toothed plate together with the casing tube can be displaced axially relative to the locking element and the casing unit with little force exerted. If the clamping device is locked, a relative displacement between the locking element and the toothed plate is no longer possible. Such clamping devices are familiar in principle and may comprise as their movement gearing for example a spline, cam, or tilt pin gearing, which converts a rotation of a clamping bolt into a clamping movement or a clamping force. Alternatively to an activating lever, the clamping device may also be activated by a motorized drive. Then a displacement of the casing tubes within the casing unit may only still occur with very considerable force expended in the event of a crash, whereupon the deformation strips are deformed and absorb energy.

Advantageously, the first brake element may be joined by means of a releasable coupling to the second brake element and the toothed plate, while the coupling is releasable by means of a pyrotechnical switch, so that in the event of a crash only the second brake element deforms the second deformation strip. If, in the event of a crash, a central control unit after evaluating corresponding sensors decides that relatively little energy needs to be absorbed in the energy absorption device, it can trigger the pyrotechnical switch by an electrical pulse, which ignites a propellant charge and releases the mentioned coupling between the two brake elements within the shortest time, so that the first brake element remains in its position of rest, while relative movement occurs between the second brake element and the second deformation strip. Energy is absorbed only in the second deformation strip.

Preferably the casing unit is supported by a bracket. The bracket can be firmly connected to the motor vehicle and preferably comprises two side cheeks, extending parallel to each other, while the casing unit is received between the side cheeks. It may be provided that the casing unit can swivel relative to the bracket. Thanks to the swiveling capacity of the casing unit and the inner casing tube received therein with respect to the bracket, a height adjustment is provided.

Preferably the carrier plate is configured as flat strips. The carrier plate can be formed as a stamped and bent sheet metal part. This affords the advantage of simple and cost-effective production of the carrier plate.

FIG. 1 shows a steering column according to the invention, in which an inner casing tube 1 is received in an outer casing unit 2 movably in the axial direction 3, so that the steering column is telescopic. A steering shaft 4 is mounted in the casing tube 1 rotatably about a longitudinal axis L. The axial direction 3 is parallel to the longitudinal axis L, hence the axial direction 3 is tantamount to the direction of the longitudinal axis L. The steering shaft 4 likewise consists of two mutually telescopic steering shaft pieces, wherein the steering shaft 4 at its front end comprises a coupling portion 41 for coupling with a fork of a universal joint of an intermediate steering shaft. The outer casing unit 2 is supported by a rear bracket 100 connected to a vehicle. The bracket 100 comprises two side cheeks 101, and the side cheeks 101 each comprise an oblong hole 102 extending in a direction orthogonal to the longitudinal axis L. The outer casing unit 2 comprises a front holding portion 201 with which the casing unit 2 can be fastened to the vehicle. The holding portion 201 becomes elastically deformed upon swiveling of the outer casing unit 2 and the inner casing tube 1 with respect to the bracket 100 in order to provide a height adjustment in the height direction H.

Operatively arranged between the casing tube 1 and the casing unit 2 is an energy absorption device 5, comprising a first deformation strip 6 and a second deformation strip 7, which are mounted on a carrier plate 8. The carrier plate 8 is fastened by means of two rivet connections 14, 17 to the casing tube 1. Mounted directly on the carrier plate 8 is the second deformation strip 7, which is fastened by the same rivet connections 14, 17. On the second deformation strip 7 is mounted a first deformation strip 6, being fastened at its front end by means of a rivet connection 15 directly to the carrier plate 8, which comprises an offset 18 for this purpose. The rear end of the first deformation strip 6 is fastened by means of a rivet connection 16 to the second deformation strip 7.

The first deformation strip 6 is formed narrower in its deformation region than the second deformation strip 7. On the first deformation strip 6 there is seated a first brake element 9, which embraces the first deformation strip 6 and clamps it at the sides. The first brake element 9 is designed as a deformation sled and comprises a pair of boltlike rounded projections 91, which interact with the first deformation strip 6 and deform the narrow sides of the deformation strip 6 in the event of a crash. A second brake element 10 is configured somewhat more broadly and embraces both the first deformation strip 6 and the second deformation strip 7, but only clamps the second deformation strip 7, while the first deformation strip 6 can slide freely through the second brake element 10. The second brake element 10 is fastened directly to one end of a toothed plate 11, while the first brake element 9 is fastened to a bridge 19, joining the two brake elements 9, 10 together. The connection between the first brake element 9 and the bridge 19 is releasable. The second brake element 10 is designed as a deformation sled, while the brake element 10 comprises a first pair of boltlike rounded projections 111 and a second pair of boltlike rounded projections 112, which interact with the narrow sides of the first deformation strip 6 and deform them in the event of a crash. The first and the second pair of projections 111, 112 are spaced apart from each other in the direction of the longitudinal axis L.

A pyrotechnical switch 13 is fastened by means of a screw 20 to the bridge 19. The pyrotechnical switch 13 is designed to switch a coupling 12 which joins the first brake element 9 to the bridge 19. The coupling consists of a bolt, which protrudes into a borehole 21 of the first brake element 9.

When the casing tube 1 in the event of a crash is displaced in the axial direction 3 relative to the toothed plate 11, it carries along with it the carrier plate 8 and the two deformation strips 6, 7. The deformation strips 6, 7 are pulled or, depending on perspective, pushed through the brake elements 9, 10, whereupon the pair of projections 91 of the first brake element 9 deforms the first deformation strip 6 and the first and second pair of projections 111, 112 of the second brake element 10 deform the second deformation strip 7. The deformation strips 6, 7 in this process take up the energy provided by the displacement of the casing tube 1.

If less energy is to be absorbed in the event of a crash, the pyrotechnical switch 13 is activated by a central control unit of the motor vehicle, whereupon the bolt of the coupling 12 is pulled out from the borehole 21 of the first brake element 9. Now, if the first deformation strip 6 moves in the axial direction 3, the first brake element 9 will remain in its starting position on the first deformation strip 6 and will be carried along by the first deformation strip 6 in the axial direction 3. In this way, the first brake element 9 does not slide along the first deformation strip 6 and hence the associated deformation energy will not be absorbed. Only the second deformation strip 7 will be pulled through and deformed by the second brake element 10, and thus on the whole only the deformation energy of the second deformation strip 7 will be absorbed.

As is best seen from FIGS. 6 and 7, the carrier plate 8 with the first deformation strip 6 and to a lesser degree also the second deformation strip 7 extends beyond the left end of the casing tube 1, as shown in FIGS. 4 to 7, in the axial direction 3. Thanks to this measure, the deformation strip 6, 7 can be configured longer than if they had to be accommodated on the length of the casing tube 1. Conversely, the casing tube 1 can also be shorter in the axial direction 3, without having to also make the deformation strips 6, 7 shorter. A longer casing tube 1 would require a longer casing unit 2, so that the steering column on the whole would be longer and less compact and comprise a larger installation space requirement. Thanks to the arrangement of the deformation strips 6, 7 according to the invention on the carrier plate 8, protruding beyond the casing tube 1 in the axial direction, the steering column may thus be on the whole more compact and shorter in design in the axial direction 3.

In the event of a crash, the casing tube 1 is displaced inside the casing unit 2 up to a point where the displacement must end, because a ball bearing 22 is arranged there for the mounting of the steering shaft 4 in the casing unit 2. The ball bearing 22 hinders further displacement of the casing tube 1 in the axial direction 3. This can be best seen from FIG. 7. The schematically represented longitudinal section through the longitudinal axis L in FIG. 7 shows the steering column after the crash has occurred, whereupon the inner casing tube 1 is entirely telescoped into the outer casing unit 2.

Figure 4:
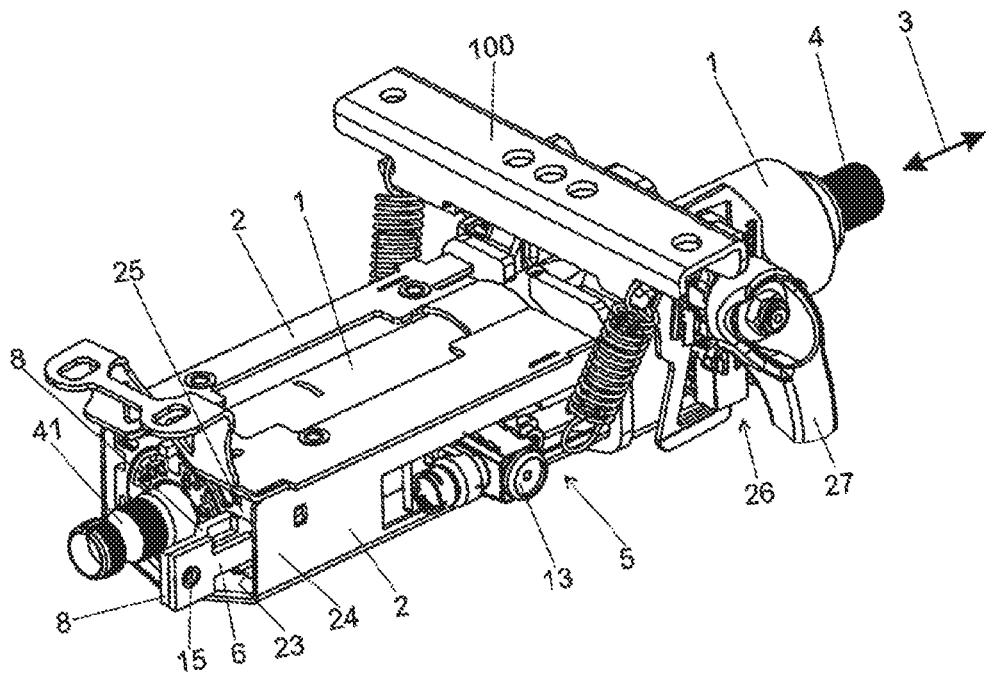
FIG. 4 is a perspective view like FIG. 3, but in the collapsed state after a vehicle crash.
Figure 5:
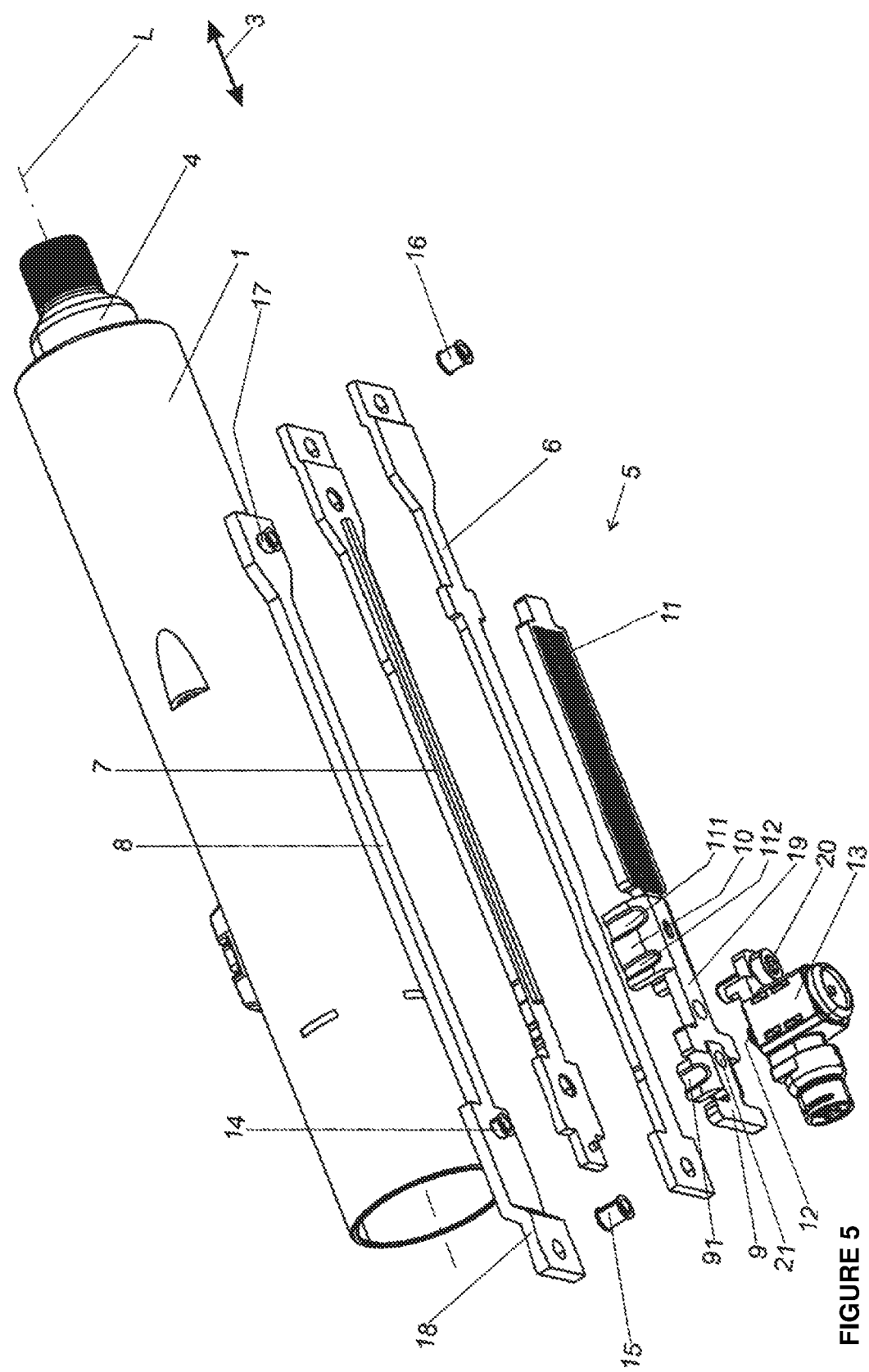
FIG. 5 is a perspective view of an inner casing tube with energy absorption device in the dismounted state.

However, the ball bearing 22 presents no obstacle for the section of the carrier plate 8 with the deformation strips 6, 7 protruding in the axial direction 3 beyond the casing tube 1, because this is fashioned as an eccentric. This section passes through an opening 23 which is formed between a wall 24 of the casing unit 2 and the adapter 25 in which the bearing 22, designed as a sealed ball bearing, is installed. The adapter 25 is installed and fixed in the receiving opening of the casing unit 2. Then the end of the carrier plate 8 and deformation strips 6, 7 protrudes from the opening 23, as can be seen in FIG. 4. In this region outside the casing unit 2 only a sufficient radial region must remain free around the steering shaft 4, yet that is assured by the eccentric arrangement of the carrier plate 8 and deformation strips 6, 7.

Figure 2:
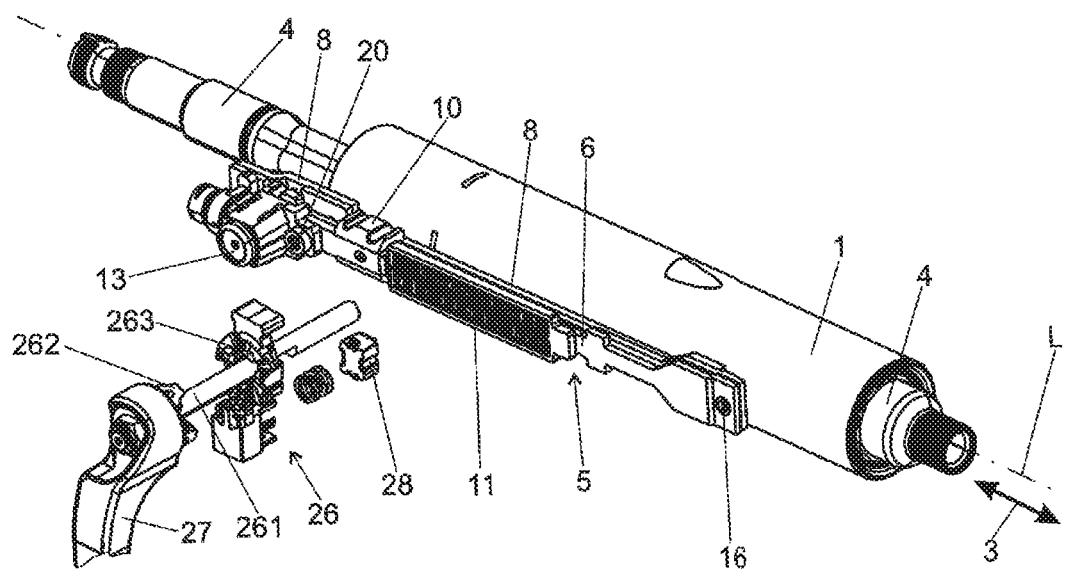
FIG. 2 is a perspective view of the inner casing tube of the steering column of FIG. 1 without the outer casing unit.
Figure 3:
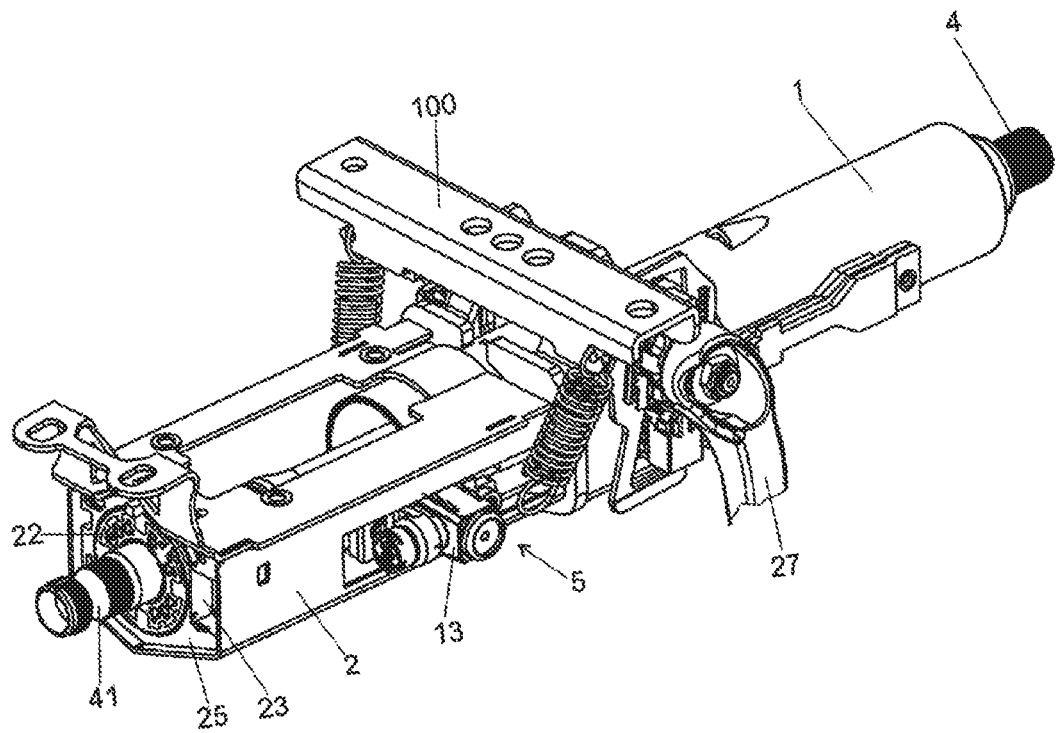
FIG. 3 is a perspective view of the steering column of FIG. 1 as seen from a different viewing direction in the installed state.

FIGS. 1 and 2 show how the toothed plate 11 interacts with a clamping device 26 mounted on the outer casing unit 2. The clamping device comprises a clamping bolt 261, which extends through an opening of the outer casing unit 2 and through the oblong holes 102 of the side cheeks 101 of the bracket 100. The clamping bolt 261 is connected to the operating lever 27 and a cam disk 262 in rotationally fixed manner. The cam disk 262 interacts with a link disk 263 as a movement gear for providing a clamping movement in the direction of the axis of the clamping bolt 261. The clamping device 26 can switch between a release position and a fixation position. If the clamping device 26 is released, i.e., in the release position, the casing tube 1 together with the toothed plate 11 can be displaced freely in the axial direction 3 with respect to the casing unit 2 and the casing unit 2 and the casing tube 1 can be swiveled with respect to the bracket 100 about the position of the steering wheel (not shown) to meet the needs of the driver in the axial direction 3 and the height direction H.

An operating lever 27 is provided for the releasing and tightening of the clamping device 26. In the released state of the clamping device 26, a locking element 28 provided with a toothing is disengaged from the toothed plate 11, so that it is slightly displaceable in the axial direction 3. The toothed plate 11 comprises a toothing with teeth which can be brought into engagement with the toothing of the locking element 28. When the clamping device 26 is tightened, the locking element 28 is pressed by its toothing against the toothing of the toothed plate 11. Since the locking element 28 is mounted immovably in the outer casing unit 2 in the axial direction 3, the toothed plate 11 in the tightened state, i.e., in the fixation position of the clamping device 26, can no longer be displaced relative to the casing unit 2 in the axial direction 3. The toothed plate 11 is therefore rigidly connected to the casing unit 2. If especially large forces occur in the event of a crash in the axial direction 3, the casing tube 1 can only still be moved in the axial direction 3 relative to the immovable toothed plate 11 when the clamping device 26 is tightened, so that the deformation strips 6, 7 are pulled through the brake elements 9, 10 and thereby present a great resistance to the axial movement of the casing tube 1. The energy provided by the movement of the casing tube 1 will be absorbed in the energy absorption device 5 according to the invention.

Figure 8:
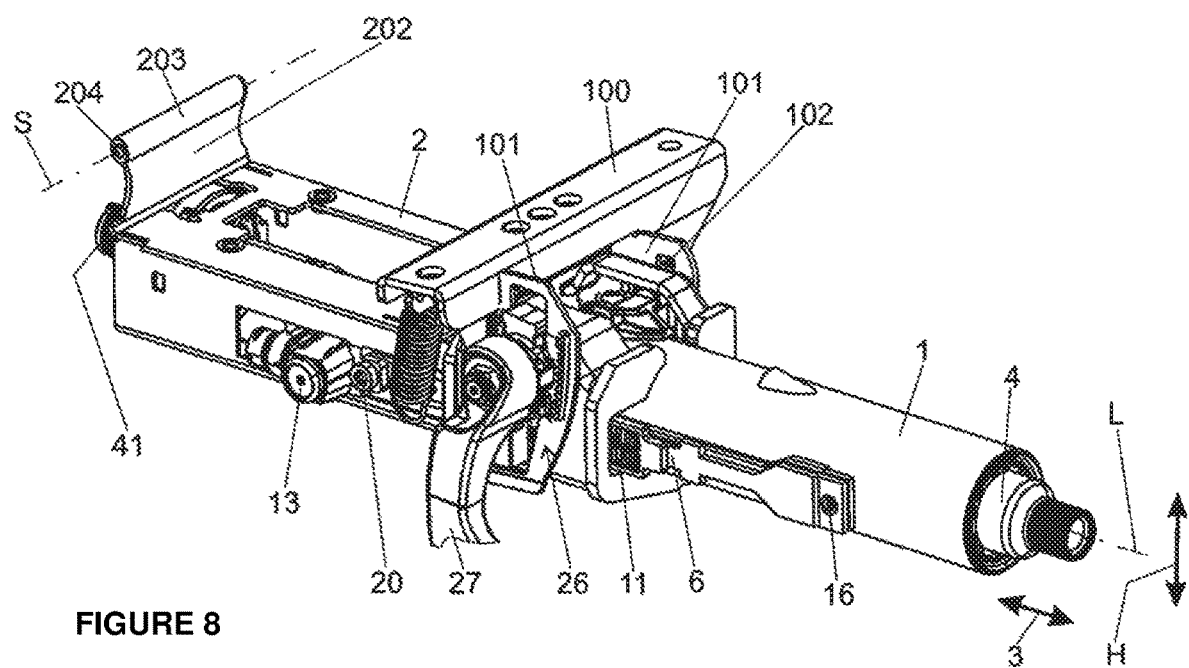
FIG. 8 is a perspective view of a steering column in a second embodiment.

FIG. 8 shows a second embodiment of a steering column according to the invention, in which an inner casing tube 1 is received in an outer casing unit 2 movably in the axial direction 3, so that the steering column is telescopic. A steering shaft 4 is mounted in the casing tube 1 rotatably about a longitudinal axis L. The steering shaft 4 likewise consists of two mutually telescopic steering shaft pieces. The outer casing unit 2 is supported by a rear bracket 100 which can be connected to a vehicle. The bracket 100 comprises two side cheeks 101, the side cheeks 101 each comprising an oblong hole 102 which extends in a direction orthogonal to the longitudinal axis L. The outer casing unit 2 comprises a front holding portion 202, and the holding portion 202 comprises a bolt receiving portion 203 with a borehole 204, the borehole 204 extending in a direction orthogonal to the longitudinal axis L. By means of a bolt which is passed through the borehole 204, the casing unit 2 can be connected to the motor vehicle in swiveling manner. Hence, the casing unit 2 can be fixed to the motor vehicle and can swivel about the axis S of the borehole 204, the axis S being also called the swivel axis.

The invention thus accomplishes a longer axial displacement distance of the casing tube 1 while at the same time reducing the installation space requirement due to a shorter length of the casing tube 1. This is made possible in that the carrier plate 8 with the deformation strips 6, 7 can move out partly from the casing unit 2 in the event of a crash before the casing tube 1 comes to a stop against the front end face of the casing unit 2.

LIST OF REFERENCE SYMBOLS

1 Casing tube
2 Casing unit
3 Axial direction
4 Steering shaft
5 Energy absorption device
6 First deformation strip
7 Second deformation strip
8 Carrier plate
9 First brake element
10 Second brake element
11 Toothed plate
12 Coupling
13 Pyrotechnical switch
14 Rivet connection
15 Rivet connection
16 Rivet connection
17 Rivet connection
18 Offset
19 Bridge
20 Screw
21 Borehole
22 Ball bearing
23 Opening
24 Wall
25 Outer edge
26 Clamping device
27 Operating lever
28 Locking element

What is claimed is:

1. A steering column for a motor vehicle, comprising:
   a steering shaft,
   an inner casing tube which rotatably supports the steering shaft,
   an outer casing unit in which the inner casing tube is received movably in the axial direction and is fixable, and
   an energy absorption device which is arranged functionally between the casing tube and the casing unit, in which a portion of the energy occurring in the event of a crash can be absorbed when the casing tube is moved telescopically relative to the casing unit, wherein the energy absorption device comprises:
      a brake element,
      a deformation strip configured to move through and be deformed by the brake element in a crash event, and
      a carrier plate, on which the deformation strip is fastened, the carrier plate fastened to the casing tube.

2. The steering column of claim 1, wherein the carrier plate projects in the axial direction beyond the casing tube.

3. The steering column of claim 2, wherein a portion of the carrier plate projecting beyond the casing tube with the deformation strip passes axially through an opening of the outer casing unit in the event of a crash.

4. The steering column of claim 3, wherein the opening is arranged radially outside a bearing for the steering shaft.

5. The steering column of claim 1, wherein the carrier plate is fastened by rivet connections to the casing tube.

6. The steering column of claim 1, wherein two deformation strips are fastened to the carrier plate, which interact with two brake elements.

7. The steering column of claim 6, wherein the two deformation strips are arranged one on top of the other, a first of the deformation strips lying on top narrower than a second of the deformation strips lying underneath, the first of the deformation strips embraced and clamped by a narrower first brake element and the second of the deformation strips by a broader second brake element.

8. The steering column of claim 7, wherein the brake elements are joined by a toothed plate to the outer casing unit, a locking element provided with teeth is joined to the outer casing unit by a clamping device, which presses the locking element against the toothed plate in order to fix it immovably on the casing unit during driving operation, so that a displacement of the casing tube with respect to the casing unit in the event of a crash is only possible by activating the energy absorption device.

9. The steering column of claim 8, wherein the first brake element is joined by a releasable coupling to the second brake element and the toothed plate and the coupling is releasable by a pyrotechnical switch, so that in the event of a crash only the second brake element deforms the second deformation strip.

10. The steering column of claim 1 configured such that energy absorbed by the brake element deforming the deformation strip in a crash event is the primary source of energy absorption in the energy absorption device.

11. A steering column comprising:
    a steering shaft;
    an inner casing tube that rotatably supports the steering shaft;
    an outer casing unit in which the inner casing tube is received movably in an axial direction and is fixable;
    an adapter that is disposed within the outer casing unit and includes a ball bearing for rotatably supporting the steering shaft, wherein the steering shaft, the inner casing tube, and the adapter are disposed eccentrically within the outer casing unit such that an opening exists between the adapter and a wall of the outer casing unit; and
    an energy absorption device disposed operatively between the inner casing tube and the outer casing unit, in which a portion of the energy occurring in a crash event can be absorbed when the inner casing tube moves telescopically relative to the outer casing unit, wherein the energy absorption device includes a deformation strip that is disposed within the outer casing unit and either extends through or is configured in a crash event to extend through the opening between the wall of the outer casing unit and the adapter.

12. The steering column of claim 11 wherein the energy absorption device comprises:
    a brake element, wherein the deformation strip is configured to move through and be deformed by the brake element in a crash event; and
    a carrier plate on which the deformation strip is fastened, the carrier plate being fastened to the inner casing tube.

13. The steering column of claim 12 wherein the carrier plate is disposed radially between the adapter and the deformation strip.

14. The steering column of claim 11 wherein the carrier plate either extends through or is configured in a crash event to extend through the opening between the wall of the outer casing unit and the adapter.

15. The steering column of claim 11 wherein the carrier plate projects in the axial direction beyond the inner casing tube.

16. A steering column comprising:
a steering shaft;
an inner casing tube that rotatably supports the steering shaft;
an outer casing unit in which the inner casing tube is received movably in an axial direction and is fixable;
an energy absorption device disposed operatively between the inner casing tube and the outer casing unit, in which a portion of the energy occurring in a crash event can be absorbed when the inner casing tube moves telescopically relative to the outer casing unit, wherein the energy absorption device includes a deformation strip; and
a brake element that comprises a first pair of rounded projections that opposes a second pair of rounded projections, wherein in a crash event the first and second pairs of rounded projections are configured to deform the deformation strip as the deformation strip moves through the brake element.

17. The steering column of claim 16 wherein the energy absorption device comprises a carrier plate on which the deformation strip is fastened, the carrier plate being fastened to the inner casing tube.

18. The steering column of claim 16 wherein the deformation strip is a first deformation strip and the brake element is a first brake element, wherein the energy absorption device comprises a second deformation strip, with the second brake element comprising a first pair of rounded projections that opposes a second pair of rounded projections, wherein in a crash event the first and second pairs of rounded projections of the second brake element are configured to deform the second deformation strip as the second deformation strip moves through the second brake element.

19. The steering column of claim 18 wherein the first and second deformation strips are arranged one on top of the other, the first deformation strip lying on top being narrower than the second deformation strip lying underneath.

20. The steering column of claim 18 wherein projections of the first pair of rounded projections of the first brake element are spaced farther apart than projections of the first pair of rounded projections of the second brake element.

* * * * *